United States Patent
Nguyen et al.

(10) Patent No.: US 7,891,605 B2
(45) Date of Patent: Feb. 22, 2011

(54) AUTOMATIC CONTROL SYSTEMS FOR AIRCRAFT AUXILIARY POWER UNITS, AND ASSOCIATED METHODS

(75) Inventors: Phuong H. Nguyen, Kent, WA (US); Joseph A. Sikora, Seattle, WA (US); Thomas A. Campbell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 366 days.

(21) Appl. No.: 12/047,833

(22) Filed: Mar. 13, 2008

(65) Prior Publication Data

US 2009/0037036 A1    Feb. 5, 2009

Related U.S. Application Data

(62) Division of application No. 10/951,185, filed on Sep. 27, 2004, now Pat. No. 7,364,116.

(51) Int. Cl.
*B64D 41/00* (2006.01)
*B60L 1/00* (2006.01)

(52) U.S. Cl. .................. 244/58; 244/60; 244/76 R; 307/9.1

(58) Field of Classification Search .............. 307/9.1
See application file for complete search history.

(56) References Cited

U.S. PATENT DOCUMENTS

| | | | |
|---|---|---|---|
| 2,016,253 A | 10/1935 | Noblitt et al. | |
| 2,512,155 A | 6/1950 | Hill | |
| 2,988,302 A | 6/1961 | Smith | |
| 3,033,307 A | 5/1962 | Sanders et al. | |
| 3,353,626 A | 11/1967 | Cremer et al. | |
| 3,382,671 A | 5/1968 | Ehni, III | |
| 3,437,173 A | 4/1969 | Ehrich | |

(Continued)

FOREIGN PATENT DOCUMENTS

CA    2261730    2/1998

(Continued)

OTHER PUBLICATIONS

Aries Limited, "Model "A" Ford Tapered Muffler," mhtml:file;//C:/TEMP/Model%20A%20Ford%20Tapered%20Muffler.mht, 1 page [Accessed May 28, 2004].

(Continued)

*Primary Examiner*—Timothy D Collins
*Assistant Examiner*—Joseph W Sanderson
(74) *Attorney, Agent, or Firm*—Perkins Coie LLP

(57) ABSTRACT

Systems and methods for operating aircraft power systems are disclosed. A power system in accordance with one embodiment of the invention includes an aircraft auxiliary power unit and a controller coupled to the aircraft auxiliary power unit, with the controller being configured to automatically stop the auxiliary power unit while the auxiliary power unit is functioning normally. The controller can also be configured to automatically start the auxiliary power unit in-flight when power supplied or expected to be supplied to a subsystem of the aircraft has a non-zero value at or below a threshold value. The controller may also be configured to start the auxiliary power unit when a load or expected load on the subsystem meets or exceeds a threshold value.

22 Claims, 3 Drawing Sheets

U.S. PATENT DOCUMENTS

| | | |
|---|---|---|
| 3,439,774 A | 4/1969 | Callaway et al. |
| 3,519,843 A | 7/1970 | Trautman |
| 3,648,803 A | 3/1972 | Heath et al. |
| 3,680,660 A | 8/1972 | Dubois |
| 3,764,815 A | 10/1973 | Habock et al. |
| 3,913,702 A | 10/1975 | Wirt et al. |
| 3,920,095 A | 11/1975 | Clark |
| 4,001,892 A | 1/1977 | Castelli |
| 4,091,892 A | 5/1978 | Hehmann et al. |
| 4,137,992 A | 2/1979 | Herman |
| 4,226,297 A | 10/1980 | Cicon |
| 4,244,441 A | 1/1981 | Tolman |
| 4,314,621 A | 2/1982 | Hansen |
| 4,359,136 A | 11/1982 | Eriksson |
| 4,360,075 A | 11/1982 | Blaser et al. |
| 4,370,560 A | 1/1983 | Faulkner et al. |
| 4,371,053 A | 2/1983 | Jones |
| 4,418,879 A | 12/1983 | Vanderleest |
| 4,456,830 A | 6/1984 | Cronin |
| 4,645,032 A | 2/1987 | Ross et al. |
| 4,706,908 A | 11/1987 | Huffman et al. |
| 4,744,440 A | 5/1988 | Hanson |
| 4,979,587 A | 12/1990 | Hirt et al. |
| 5,152,141 A | 10/1992 | Rumford et al. |
| 5,162,620 A | 11/1992 | Ross et al. |
| 5,268,541 A | 12/1993 | Pettersson |
| 5,365,025 A | 11/1994 | Kraai et al. |
| 5,655,359 A | 8/1997 | Campbell |
| 5,734,239 A | 3/1998 | Turner |
| 5,735,116 A | 4/1998 | Mouton et al. |
| 5,899,411 A | 5/1999 | Latos et al. |
| 5,902,970 A | 5/1999 | Ferri |
| 6,018,233 A | 1/2000 | Glennon |
| 6,039,287 A | 3/2000 | Liston et al. |
| 6,092,360 A | 7/2000 | Hoag et al. |
| 6,158,546 A | 12/2000 | Hanson et al. |
| 6,244,539 B1 | 6/2001 | Liston et al. |
| 6,264,137 B1 | 7/2001 | Sheoran |
| 6,272,838 B1 | 8/2001 | Harvell et al. |
| 6,308,915 B1 | 10/2001 | Liston et al. |
| 6,360,844 B2 | 3/2002 | Hogeboom et al. |
| 6,508,219 B2 | 1/2003 | Schorn |
| 6,615,576 B2 | 9/2003 | Sheoran et al. |
| 6,651,929 B2 | 11/2003 | Dionne |
| 4,064,961 A1 | 2/2004 | Tseo |
| 6,695,094 B2 | 2/2004 | Moffat et al. |
| 6,698,180 B2 | 3/2004 | Snyder |
| 6,735,951 B2 | 5/2004 | Thompson |
| 6,777,822 B1 | 8/2004 | Suttie et al. |
| 7,210,652 B2 | 5/2007 | Hein et al. |
| 7,210,653 B2 | 5/2007 | Atkey et al. |
| 2003/0126864 A1 | 7/2003 | Thompson |
| 2006/0043236 A1 | 3/2006 | Campbell |
| 2006/0061213 A1 | 3/2006 | Michalko |
| 2006/0071123 A1 | 4/2006 | Nguyen |
| 2006/0102779 A1 | 5/2006 | Campbell |
| 2006/0102781 A1 | 5/2006 | Hein et al. |
| 2006/0168968 A1 | 8/2006 | Zielinski |
| 2007/0063098 A1 | 3/2007 | Dionne |

FOREIGN PATENT DOCUMENTS

| | | |
|---|---|---|
| DE | 69712210 | 10/2002 |
| DE | 69712797 | 11/2002 |
| EP | 0923488 | 4/2002 |
| EP | 1010618 B1 | 5/2002 |
| EP | 1686058 | 8/2006 |
| JP | 57-113919 | 7/1982 |
| JP | 05-163925 | 6/1993 |
| JP | 2000516553 | 12/2000 |
| WO | WO-9805553 | 2/1998 |
| WO | WO-01/47100 | 6/2001 |
| WO | WO-02/066323 | 8/2002 |
| WO | WO-2004/037641 | 5/2004 |

OTHER PUBLICATIONS

Henri Coanda, mhtml:file://C:\TEMP\Henri%20Coanda.mht, pp. 1-3 [Accessed May 28, 2004].

http://www.b737.org.uk/acdcmeteringpanel.jpg; 1pg; date unknown.

Michael Andretti Powersports, "Titanium Oval Muffler," mhtml:file://C:\TEMP\OVAL%20MUFFLER%20-%20step%20increases.mht, pp. 1-2 [May 28, 2004].

What About Transfer Switches?, <http://www.generatorjoe.net/html/VVhatAboutsws.html>, copyright Quartz Castle Inc. & GeneratorJoe, accessed Aug., 9 2007.

Brady, Chris, The 737 APU: Auxilary Power Unit, The APU described, <http://www.b737.org.uk/apu.htm>, updated Jun. 18, 2007, accessed Aug. 9, 2007, 12 pages.

PCT International Search Report and Written Opinion for PCT/US2005/032738; Applicant: The Boeing Company; European Patent Office; dated Jan. 9, 2007, 13 pages.

AUTOMATIC CONTROL SYSTEMS FOR AIRCRAFT AUXILIARY POWER UNITS, AND ASSOCIATED METHODS

CROSS-REFERENCE TO RELATED APPLICATION

This application is a divisional of U.S. application Ser. No. 10/951,185, filed Sep. 27, 2004 which is incorporated herewith in its entirety.

TECHNICAL FIELD

The present invention relates generally to automatic control systems for aircraft auxiliary power units, and associated methods.

BACKGROUND

Existing commercial transport jet aircraft typically include two or more primary turbine engines for propulsion. These aircraft also typically include at least one auxiliary power unit (APU) that provides electrical and/or pneumatic power in addition to or in lieu of the power provided by the primary engines. Accordingly, APUs can be used to provide power to the aircraft when the primary engines are not running, for example, when the aircraft is waiting in an airport gate. The APUs can also provide temporary power to start the primary engines during normal operations, and/or temporary emergency power during an engine-out condition or other emergency condition.

FIG. 1 illustrates a system configured in accordance with the prior art, in which an APU 10 provides temporary electrical power to an aircraft electrical system 40. A controller 20 directs the operation of the APU 10, and a control input device 30 (typically housed at the flight deck of the aircraft) allows a pilot or other operator to manually direct the operation of the controller 20 and therefore the APU 10. Accordingly, the control input device 30 can include a rotary knob that is in an "off" position when the APU 10 is unstarted. The pilot or other operator rotates the knob to the "start" position to start the APU 10. Then, the operator releases the knob, which is spring loaded so as to rotate back to the "on" position. The APU 10 remains in a started state with the knob in the "on" position until the pilot manually moves the knob to the "off" position.

In certain aircraft, the controller 20 can automatically shut down the APU 10 in case of significant operating malfunctions. Such malfunctions include a fire in the compartment housing the APU 10, or failure of the APU 10 itself. In certain aircraft, the controller 20 will start the APU 10 automatically only if all electrical power on the aircraft has failed. Accordingly, the APU 10 can provide automatic backup power in this emergency situation. Typically, a manual action is required to start the APU and, in other situations, the APU 10 can be configured to operate during an entire flight. In most situations, the APU 10 need not be operational for the aircraft to be dispatched. If the APU 10 is not operational and additional power is required during flight, the same signal that triggers in-flight emergency starting of the APU 10 can instead trigger deployment of a ram air turbine, which provides additional electrical power during flight.

While the APU system described above provides adequate ground and emergency power for existing aircraft, both airline operators and airline manufacturers have come under pressure to increase the efficiency of overall aircraft operations. Accordingly, it may be desirable to further increase the overall efficiency of aircraft power system and aircraft APUs to reduce aircraft operational costs.

SUMMARY

The present invention is directed generally to systems and methods for providing power to an aircraft. An aircraft power system in accordance with one aspect of the invention includes an aircraft auxiliary power unit and a controller coupled to the aircraft auxiliary power unit. The controller can be configured to automatically stop the auxiliary power unit while the auxiliary power unit is functioning normally. Accordingly, in further particular aspects of the invention, the controller can be configured to automatically stop the auxiliary power unit while the aircraft is in flight and after the auxiliary power unit was started while the aircraft was on the ground. The controller can also be configured to automatically start the auxiliary power unit while the aircraft is in flight.

In further aspects of the invention, the controller can be configured to automatically start the auxiliary power unit in flight when power supplied or expected to be supplied to an aircraft subsystem (e.g., an electrical circuit) to which the auxiliary power unit is coupleable has a non-zero value at or below a threshold value. In yet another aspect of the invention, the controller can be configured to automatically start the auxiliary power unit in flight when a load or expected load on the aircraft subsystem meets or exceeds a threshold value.

The invention is also directed toward methods for operating an aircraft power system. In one aspect of the invention, such a method includes starting an aircraft auxiliary power unit by operating an input device to direct a first control signal to the auxiliary power unit. The method can further include authorizing automatic operation of the auxiliary power unit by directing a second control signal. Operating an input device can include manually operating a rotary, multi-position switch at an aircraft flight deck.

A method for operating an aircraft power system in accordance with another aspect of the invention includes receiving a first signal corresponding to a load on an aircraft subsystem (e.g., an electrical power system) coupled to an aircraft auxiliary power unit, and receiving a second signal corresponding to power provided to the subsystem. If a difference between the power and the load is at or below a first threshold value and the auxiliary power unit is not started, the method can further include automatically starting the auxiliary power unit. If the difference between the power and the load is at or above a second threshold value and the auxiliary power unit is started, the method can further include automatically stopping the auxiliary power unit.

DETAILED DESCRIPTION

The present invention is directed generally toward systems and methods for controlling operation of aircraft auxiliary power units (APUs). Several embodiments of systems and methods for controlling APUs are described below. A person skilled in the relevant art will understand, however, that the invention may have additional embodiments, and that the invention may be practiced without several of the details of the embodiments described below with reference to FIGS. 2-4.

Figure 2:
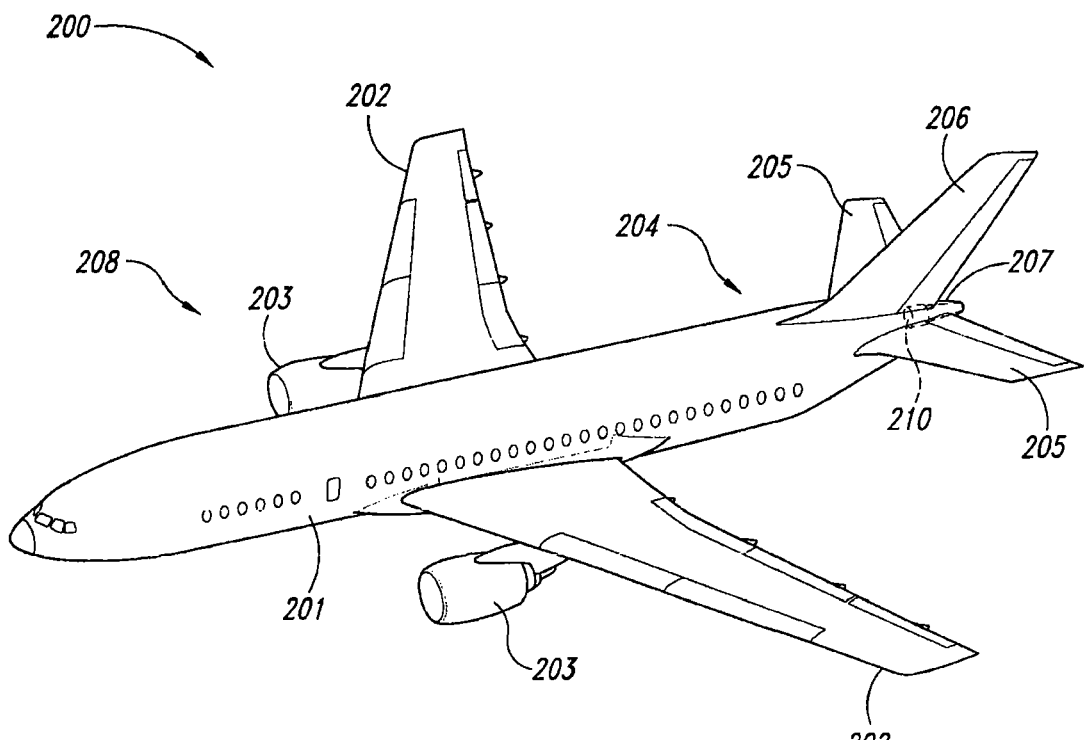
FIG. 2 is a partially schematic, isometric illustration of an aircraft having an auxiliary power unit controlled and configured in accordance with an embodiment of the invention.

FIG. 2 is a partially schematic, isometric illustration of an aircraft 200 having a fuselage 201, wings 202, and an empennage 204 that includes a tail cone 207. Horizontal stabilizers 205 and a vertical stabilizer 206, along with associated control surfaces on the stabilizers and wings 202 provide stability and control for the aircraft 200. Primary power is provided by two primary engines 203 (e.g., turbofan engines) carried by the wings 202 (as shown in FIG. 2) and/or other portions of the aircraft 200. An APU 210 can be positioned in the tail cone 207 (or elsewhere within the aircraft 200) to provide auxiliary electrical or pneumatic power for the aircraft 200. Further details of systems and methods for controlling the APU 210 are described below with reference to FIGS. 3 and 4.

Figure 3:
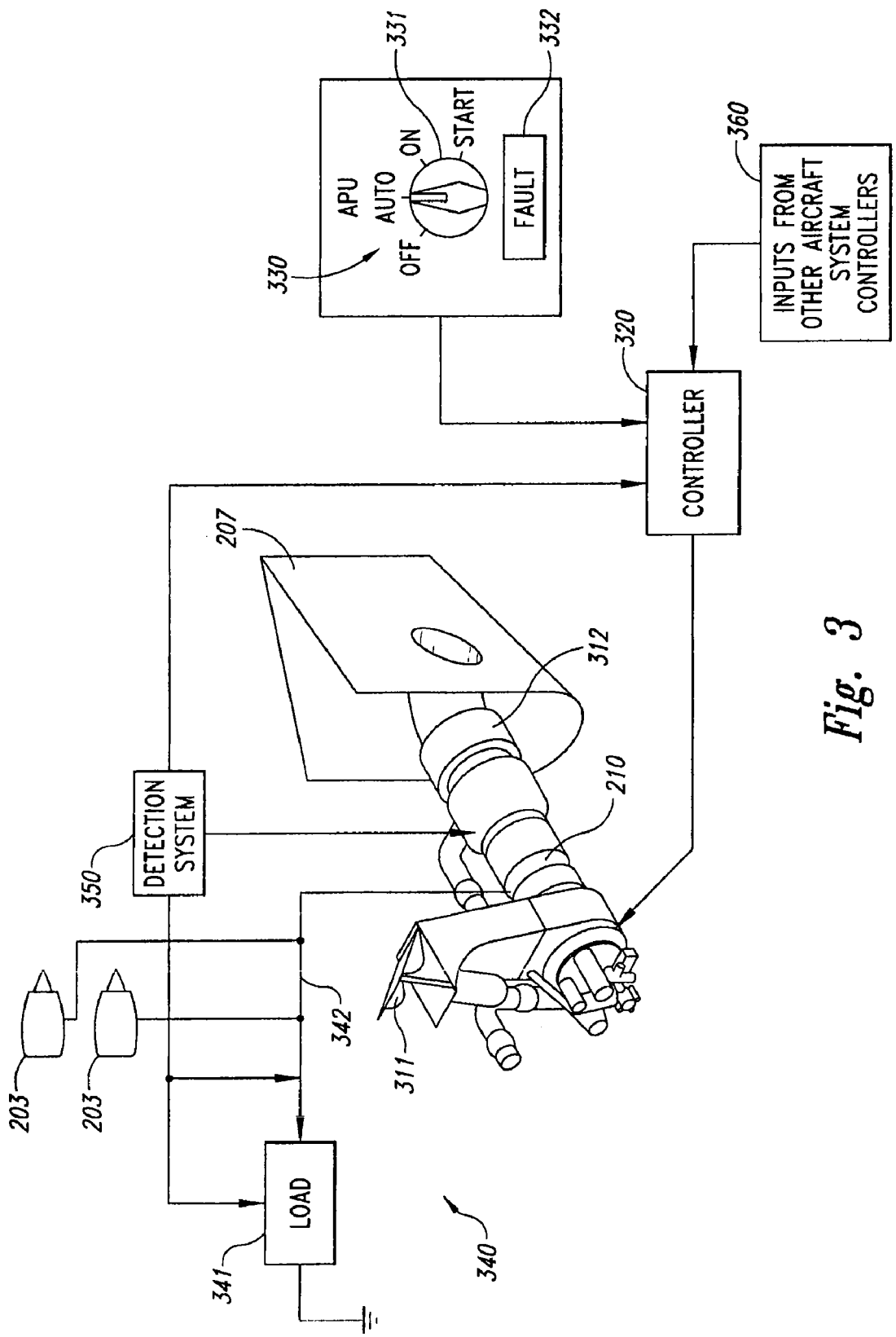
FIG. 3 is a partially schematic, isometric illustration of an auxiliary power unit, associated power system, controller, and input device configured in accordance with an embodiment of the invention.

FIG. 3 illustrates the APU 210 positioned within the tail cone 207 of the aircraft 200. The APU 210 can include a compressor that receives air from an inlet 311. Exhaust products from the APU 210 can be vented from the aircraft 200 via an exhaust duct 312. The electrical power generated by the APU 210 can be provided to a power bus 342. The power bus 342 can also receive power from the primary engines 203, and can provide power to multiple electrically driven devices (including, but not limited to, lights, galleys, and ice protection systems), represented collectively as a load 341 in FIG. 3. Accordingly, the load 341, the bus 342, the primary engines 203 and the APU 210 can form an electrical power system 340 of the aircraft 200. The power system 340 can include other components as well (e.g., a deployable ram air turbine for emergency power generation) that are not shown in FIG. 3 for purposes of clarity.

The electrical load 341 and the circuit to which it is coupled provide an example of a subsystem that receives power from the APU 210. In other embodiments, the APU 210 can provide power to other subsystems, e.g., hydraulic subsystems and/or pneumatic subsystems. Accordingly, aspects of the invention described below in the context of electrical systems apply as well to other subsystems, including without limitation, pneumatic subsystems and hydraulic subsystems.

The APU 210 can be coupled to a controller 320 that (a) responds to manual instructions from the flight crew to start and/or stop the APU 210, and/or (b) autonomously and automatically provides instructions to start and/or stop the APU 210, without requiring inputs from the flight crew. As described below, the controller 320 can be coupled to an input device 330 that allows the flight crew to select between manual and automatic operation, and allows the flight crew to select which manual instruction will be provided to the controller 320.

Figure 1:
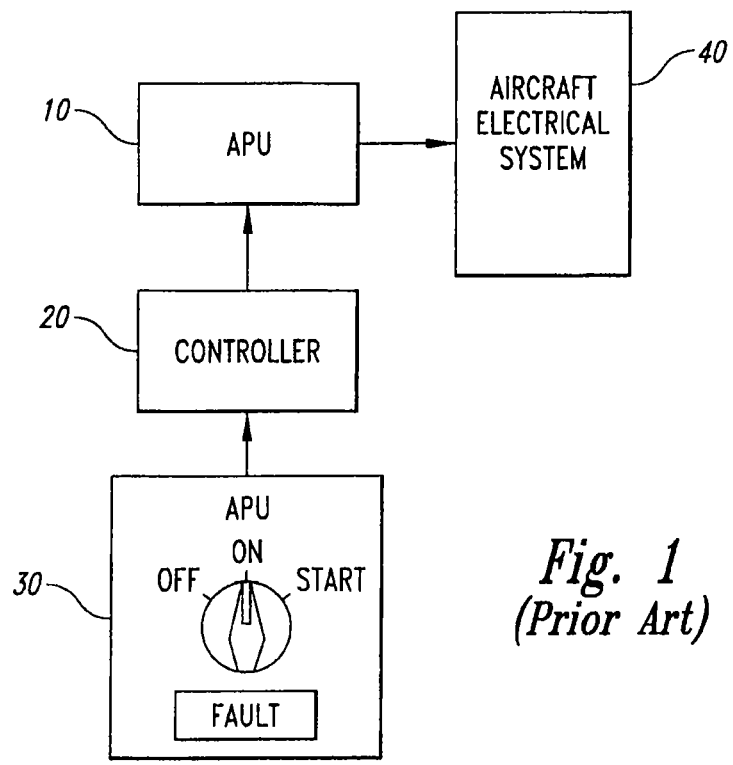
FIG. 1 is a partially schematic illustration of a system for controlling an aircraft auxiliary power unit in accordance with the prior art.

The input device 330 can include a rotary switch 331 that can be rotated from an "off" position to a "start" position for manually starting the APU 210, and can then return to an "on" position after the operator (e.g., the pilot or other crew member) has released the switch 331. This aspect of the operation of the input device 330 is accordingly generally similar to that described above with reference to the input device 30 shown in FIG. 1. The input device 330 shown in FIG. 3 can also include an "auto" position in which the APU 210 starts and/or stops automatically, without direct inputs from the flight crew via the input device 330. When the input device 330 is in the "auto" position, the controller 320 can automatically start and/or stop the APU 210, for example, in response to signals received from a detection system 350 and/or other aircraft system controllers 360. In one aspect of this embodiment, the detection system 350 can be configured to detect the size of the electrical load or demand placed on the electrical power system 340 by the load 341. In another aspect of this embodiment, the detection system 350 can determine how much power is being supplied to electrical power system 340 by the APU 210, the primary power units 203, and/or any other power generators coupled to the power system 340. In still further aspects of this embodiment, the detection system 350 can detect the current state of the APU 210, including whether or not the APU 210 is operating, and/or whether the APU 210 or the compartment in which it is housed are experiencing a malfunction. Such malfunctions can include high APU temperature, low APU oil pressure, and/or a fire or other high temperature event in the APU compartment. The crew can be alerted to malfunction by an illuminated "FAULT" indicator 332. Other information pertaining to the status of the APU 210 can be presented to the crew via a central alerting system (not shown in FIG. 3). Such information can include whether the APU 210 is running, shutting down, shut down, in a "failed off" mode, and/or "armed" (e.g., configured to operate in the "auto" mode). Accordingly, the crew can readily assess the status of the APU 210, even if the APU 210 is being operated in the "auto" mode. Further details of the automatic operation of the APU 210 are described below with reference to FIG. 4.

Figure 4:
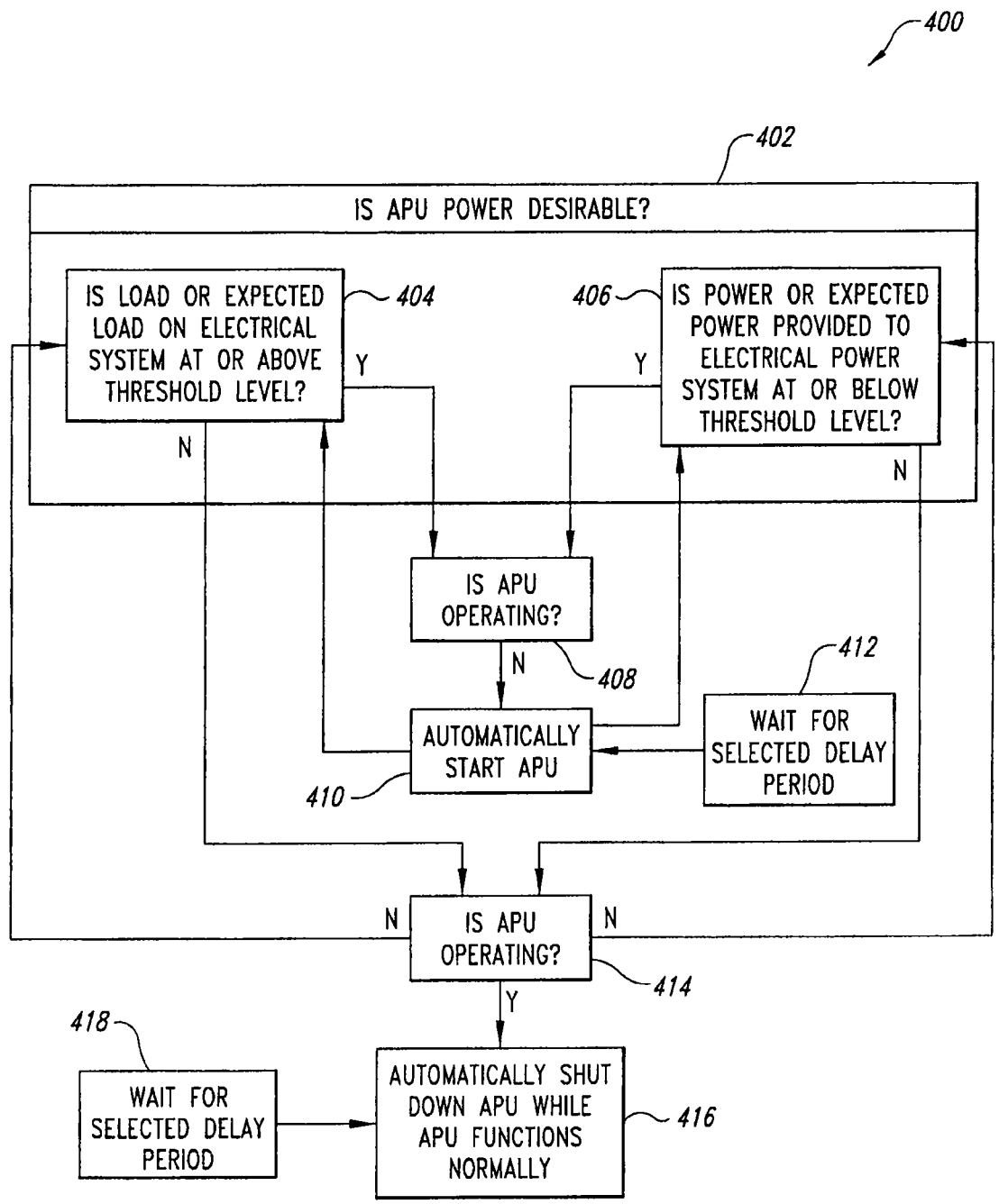
FIG. 4 is a flow diagram illustrating aspects of several methods for controlling an aircraft auxiliary power unit in accordance with multiple embodiments of the invention.

FIG. 4 illustrates a process 400 for automatically controlling an aircraft APU, in accordance with an embodiment of the invention. In process portion 402, the process 400 includes determining whether it is desirable to have the APU provide power to the aircraft electrical system. APU power may be desirable if the load on the aircraft electrical system is at or above a threshold level, or if the power provided to the electrical system is at or below a threshold level. Accordingly, the process 400 can further include determining whether the load (or expected load) on the electrical system is at or above a threshold level (process portion 404) and/or determining if power (or expected power) provided to the electrical power system has a non-zero value at or below a threshold level (process portion 406). The information for making either determination can be based upon data received from an onboard aircraft system, for example, the detection system 350 or other aircraft system controllers 360 described above with reference to FIG. 3.

If, in process portion 402, it is determined that APU power is desirable, the process 400 can further include determining whether or not the APU is currently operating (process portion 408). If the APU is not operating, the process 400 can include automatically starting the APU (process portion 410). The process 400 can optionally include waiting for a selected delay period before automatically starting the APU (process portion 412). During this delay period, the system can continually check to determine (a) if the load on the electrical system remains at or above a threshold level, and/or (b) if the power provided to the electrical power system remains at or below a threshold level. If either (or both) conditions are met for the duration of the selected delay period, the system can automatically start the APU, as indicated in process portion 410. By providing a delay period, this aspect of the method can reduce the likelihood that the APU will be repeatedly started and stopped when the load on the electrical system fluctuates close to the threshold level, and/or when the power provided to the electrical system fluctuates close to the threshold level.

If, in either process portion 404 or process portion 406, it is determined that APU power is not desirable, then the process 400 can include determining whether or not the APU is operating (process portion 414). If the APU is not operating, the process 400 can include repeating process portions 404 and/or 406 to determine whether and when APU power becomes desirable. If it is determined that the APU is operating, but that APU power is not desirable, the process 400 can include automatically shutting the APU down while the APU is functioning normally (process portion 416). In a particular aspect of this embodiment, the process 400 can include waiting for a selected delay period (process portion 418) while continuing to monitor whether APU power is desirable. If APU power remains desirable for the duration of the selected delay period, then the APU shutdown process can be completed. This optional delay period can prevent the APU from being frequently shut down and restarted if the load on the electrical system and/or the power provided to the electrical power system fluctuate close to the respective threshold levels. In any of the foregoing embodiments, the APU can also be shut down automatically if it is not functioning normally (for example, if the APU itself is malfunctioning, or if a fire is detected in the compartment housing the APU).

In other embodiments, other techniques can be used to determine when to start and/or stop the APU. For example, the APU can be started when the difference between the power provided to the electrical system and the load on the electrical system falls below a threshold value. The APU can be stopped when this difference is above the same or a different threshold value. In still further embodiments, aspects of the automatic operation of the APU can be inhibited during certain phases of operation. For example, the APU controller can be inhibited from automatically starting (and/or stopping) the APU while the aircraft is on the ground.

One feature of at least some of the embodiments described above is that the APU can be stopped automatically, even if it is running normally. An advantage of this feature is that it can reduce pilot workload by eliminating the need for the pilot or other operator to monitor the condition of the APU and manually shut the APU down when it is no longer necessary or desirable for the APU to be running. For example, during a normal ground start sequence, the pilot starts the APU, and then uses the APU to start one main engine. The started main engine is then used to start the second main engine in a process that can be repeated for as many main engines as are present on the aircraft. In an embodiment of the invention, the controller can automatically stop the APU without pilot intervention, for example, when the APU power is no longer needed, or when the aircraft leaves the ground.

Another feature of at least some embodiments of the invention is that the APU can also be started automatically. For example, if the load on the aircraft electrical system is at or above a threshold level, or the power supplied by non-APU power generators is at or below a threshold level, the APU controller can automatically start the APU. An advantage of this feature is that it eliminates the need for the pilot to monitor either the load on the electrical system or the power provided to the electrical system. Another advantage of this feature is that it can eliminate the need for the pilot to manually start the APU when the load on the electrical system or the power supplied to the electrical system fall outside selected limits.

Still another feature of at least some embodiments of the invention is that the pilot or operator can select between manual and automatic operation of the APU. An advantage of this feature is that the pilot can take over manual control of the APU at any point during the operation of the aircraft. The pilot can also authorize automatic operation of the APU, for example, by transmitting an appropriate signal via an input device.

Still another advantage of at least some of the foregoing embodiments is that they can support the increased use of electrical systems on the aircraft. For example, it may be desirable to replace some non-electrical systems (e.g., hot air anti-icing systems) with electrical counterparts (e.g., resistance heaters). It may also be desirable to add electrical power capacity (e.g., to support increased use of consumer electronics onboard the aircraft). The periodically high power demands placed by such loads on the aircraft electrical system can be more easily supported by an APU controller that starts and stops the APU on an "as needed" basis.

Yet another feature of at least some of the foregoing embodiments is that the controller can respond to actual loads and/or power levels when directing the APU to start or stop, and/or the controller can respond to anticipated loads and/or power levels. For example, if the crew or an automatic system requests power by activating a system (e.g., a galley system or ice protection system), the controller can determine if the present power level is high enough to support the new load without starting the APU. If not, the controller can automatically start the APU before supplying power to the new load. If one of the main engines begins a shutdown sequence that will result in low power supplied to the electrical system, the controller can automatically start the APU before the power falls below a threshold level.

From the foregoing, it will be appreciated that specific embodiments of the invention have been described herein for purposes of illustration, but that various modifications may be made without deviating from the spirit and scope of the invention. For example, aspects of the invention described in the context of particular embodiments can be combined or eliminated in other embodiments. Although advantages associated with certain embodiments of the invention have been described in the context of those embodiments, other embodiments may also achieve those advantages. None of the foregoing embodiments need necessarily exhibit such advantages to fall within the scope of the invention. Accordingly, the invention is not limited except as by the appended claims.

We claim:

1. A method for operating an aircraft power system, comprising:
   receiving a signal corresponding to a state of an aircraft subsystem that includes and receives power from an auxiliary power unit; and
   in response to receiving the signal, automatically stopping the auxiliary power unit, via a controller, while the auxiliary power unit is functioning normally in flight.

2. The method of claim 1 wherein the subsystem includes an electric power circuit, and wherein receiving a signal includes receiving a signal corresponding to an aircraft electrical power output provided to the aircraft electrical power circuit while the aircraft is in flight and while the auxiliary power unit of the aircraft is in an unstarted state, and wherein the method further comprise automatically starting the auxiliary power unit while the aircraft is in flight if the electrical power output is at or below a threshold value.

3. The method of claim 1 wherein the subsystem includes an electric power circuit, and wherein receiving a signal includes receiving a signal corresponding to a load on the aircraft electrical power circuit while the aircraft is in flight and while the auxiliary power unit of the aircraft is in an unstarted state, and wherein the method further comprise automatically starting the auxiliary power unit while the aircraft is in flight if the load is at or above a threshold value.

4. A method for operating an aircraft power system, comprising:
receiving a signal corresponding to an aircraft power output provided to an aircraft subsystem while the aircraft is in flight and while an auxiliary power unit of the aircraft is in an unstarted state; and
if the power output is or is expected to be at or below a threshold value, automatically starting the auxiliary power unit, via a controller, while the aircraft is in flight.

5. The method of claim 4, further comprising automatically stopping the auxiliary power unit if the power output is at or above the threshold value.

6. The method of claim 4 wherein automatically starting the auxiliary power unit includes automatically starting the auxiliary power unit after a delay from the time the signal is received.

7. A method for operating an aircraft power system, comprising:
receiving a signal corresponding to a load on an aircraft subsystem while the aircraft is in flight and while an auxiliary power unit of the aircraft is in an unstarted state; and
if the load is at or above a threshold value, automatically starting the auxiliary power unit, via a controller, while the aircraft is in flight.

8. The method of claim 7 wherein automatically starting the auxiliary power unit includes automatically starting the auxiliary power unit after a delay from the time the signal is received.

9. The method of claim 7, further comprising detecting the load and transmitting the corresponding signal.

10. The method of claim 7, further comprising automatically stopping the auxiliary power unit if the load subsequently drops below the threshold value.

11. The method of claim 7, further comprising starting the auxiliary power unit in response to an input signal provided by an operator while the aircraft is on the ground.

12. The method of claim 7, further comprising stopping the auxiliary power unit in response to an input signal provided by an operator while the aircraft is on the ground.

13. A method for operating an aircraft power system, comprising:
receiving a first signal corresponding to a load on an aircraft electrical power system;
receiving a second signal corresponding to power provided to the aircraft electrical power system;
if the first signal exceeds a first threshold level, and the auxiliary power unit is not started, automatically directing the auxiliary power unit to start, via a controller, after a delay;
if the first signal is below the first threshold level, and the auxiliary power unit is started, automatically directing the auxiliary power unit to stop, via a controller, after a delay;
if the second signal is below a second threshold level, and the auxiliary power unit is not started, automatically directing the auxiliary power unit to start, via a controller, after a delay; and
if the second signal is above the second threshold level, and the auxiliary power unit is started, automatically directing the auxiliary power unit to stop, via a controller, after a delay.

14. A method for operating an aircraft power system, comprising:
starting an aircraft auxiliary power unit by operating an input device to direct a first control signal to the auxiliary power unit; and
authorizing in-flight automatic operation of the auxiliary power unit by directing a second control signal to a controller for the auxiliary power unit.

15. The method of claim 14 wherein operating an input device includes manually operating a rotary, multi-position switch at an aircraft flight deck.

16. A method for operating an aircraft power system, comprising:
receiving a first signal corresponding to a load on an aircraft subsystem coupled to an aircraft auxiliary power unit;
receiving a second signal corresponding to power provided to the subsystem;
if a difference between the power and the load is at or below a first threshold value and the auxiliary power unit is not started, automatically starting the auxiliary power unit in flight, via a controller; and
if the difference between the power and the load is at or above a second threshold value and the auxiliary power unit is started, automatically stopping the auxiliary power unit in flight, via a controller.

17. The method of claim 16 wherein first threshold value is at least approximately the same as the second threshold value.

18. The method of claim 16 wherein automatically starting the auxiliary power unit includes automatically starting a gas turbine engine.

19. A non-transitory computer-readable medium configured to perform a method for operating an aircraft power system, the method comprising:
receiving a signal corresponding to a load on a normally functioning aircraft subsystem while the aircraft is in flight and while an auxiliary power unit of the aircraft is in an unstarted state; and
if the signal corresponds to a load or expected load that meets or exceeds a threshold value, automatically directing the auxiliary power unit to start while the aircraft is in flight, via a controller.

20. The computer-readable medium of claim 19 wherein the method further comprises automatically directing the auxiliary power unit to stop while the aircraft is in flight and the auxiliary power unit is in a started state, if the signal corresponds to a load that is at or below the threshold value.

21. A non-transitory computer-readable medium configured to perform a method for operating an aircraft power system, the method comprising:
receiving a signal corresponding to power input to a load on a normally functioning aircraft subsystem while the aircraft is in flight and while an auxiliary power unit of the aircraft is in an unstarted state; and
if the signal corresponds to a power level or expected power level that is at or below a threshold value, automatically directing the auxiliary power unit to start while the aircraft is in flight, via a controller.

22. The computer-readable medium of claim 21 wherein the method further comprises automatically directing the auxiliary power unit to stop while the aircraft is in flight and the auxiliary power unit is in a started state, if the signal corresponds to a power level that is at or above the threshold value.

* * * * *